May 10, 1966

L. E. DAY 3,250,333

ROW MARKER

Filed April 13, 1964

INVENTOR.
LEON E. DAY

BY John R. Walker, III
Attorney

May 10, 1966  L. E. DAY  3,250,333
ROW MARKER

Filed April 13, 1964　　　　　　　　　　　　　　　　　　2 Sheets-Sheet 2

INVENTOR.
LEON E DAY
BY John R. Walker, III
Attorney

United States Patent Office 3,250,333
Patented May 10, 1966

1

3,250,333
ROW MARKER
Leon E. Day, Wilson, Ark., assignor of fifty percent to Edward H. Bogard, Jr., West Memphis, Ark.
Filed Apr. 13, 1964, Ser. No. 359,056
8 Claims. (Cl. 172—126)

This invention relates to agricultural equipment and, more particularly, to a hydraulically actuated row marker which can be used in conjunction with the original equipment such as tractor-carried planters, cultivators and the like.

As is known by those skilled in the art, it is the usual practice with implements such as cultivators and planters to provide a pair of row markers which project laterally from the tractor and score the earth to guide subsequent passage of the implement over the field being worked. Markers on oppsite sides of the tractor are used alternately, with the inactive marker being held in a raised position while the other marker is marking the earth. Many of the previous markers have operated in conjunction with the raising and lowering of the tool bar, which which is a disadvantage when obstructions are encountered in the way of the marker and yet not in the way of the tractor and the planters, in which case both the planter and the marker would have to be raised to avoid the obstruction. Also, previous markers have been operated by various complicated arrangements such as cables or chains, which also have their disadvantages, as, for example, when moving up and down over high and low spots, many times the cables or chains are caused to jump from the rollers or sprockets.

The present invention is directed towards overcoming the above-mentioned and other disadvantages of previous row markers by providing a hydraulically operated row marker, which is actuated independent of the tool bar.

Thus, one of the objects of the present invention is to provide a unique marker that can be raised or lowered independently of the tool bar of the tractor on which it is mounted.

A further object is to provide such a row marker that is simple in construction and easy to operate.

A further object is to provide such a row marker that is operated by the original control lever means on the tractor to cause the marker arm to be lifted under hydraulic pressure to a latching position.

A further object is to provide, in such a row marker, latching means to latch the marking arm in the latching position.

A further object is to provide such a row marker which includes releasing means having an elongated member extending to the tractor that can be pulled by the operator of the tractor to release the marking arm and cause it to pivot under the influence of gravity to the working position.

A further object is to provide such a marking means that is quickly and easily attachable to and detachable from the existing equipment.

A further object is to provide such a row marker that, when in the working position, is freely floatable upwardly and downwardly with raised and depressed places encountered in the field.

A further object is to provide such a row marker in which the latching and releasing means are mechanically and manually actuated and are arranged so that, when the marking arm is in a latched position, the hydraulic pressure can be cut off from the marking arm whereby the marking arm is free from the hydraulic system of the tractor and is in a ready position for subsequent manual release.

A further object is generally to improve the design and construction of row markers.

2

The means by which the foregoing and other objects of the present invention are accomplished and the manner of their accomplishment will be readily understood from the following specification upon reference to the accompanying drawings, in which.

Figure 1:
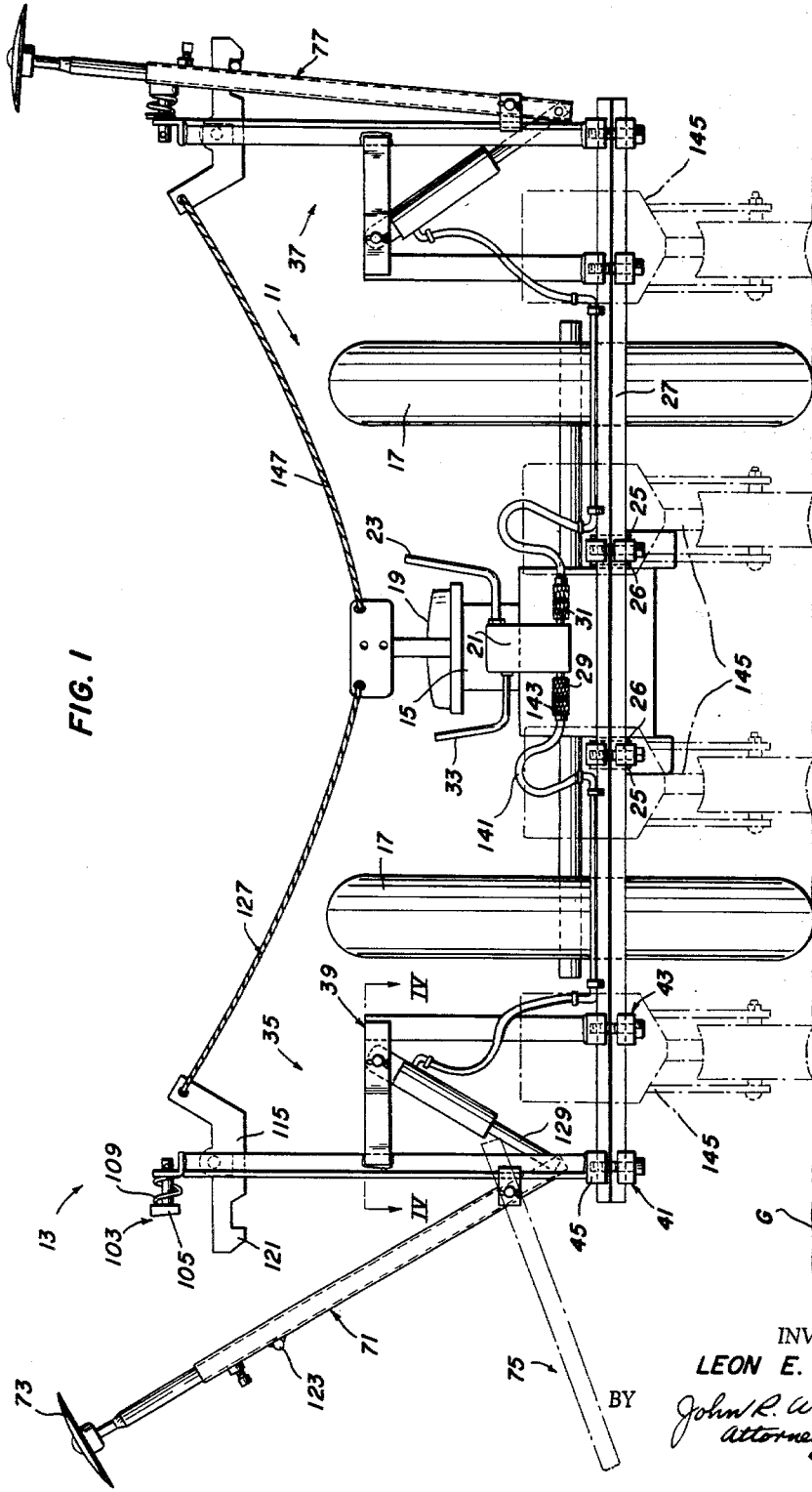
FIG. 1 is a rear elevational view of a tractor having mounted thereon planters which are shown in broken lines for purposes of clarity, and also having mounted thereon the row marking apparatus of the present invention, and with the marking arms being shown in various positions.

Referring now to the drawings in which the various parts are indicated by numerals, a typical tractor 11, with which the marker apparatus 13 of the present invention is adapted to be used, is shown in FIG. 1 wherein it will be seen that the tractor includes the usual tractor body 15 supported for movement over the ground by means of the rear wheels 17 and suitable front wheels, not shown. In addition, tractor 11 includes a seat 19 supported from body 15 for the operator of the tractor to sit on. In addition, tractor 11 comprises the usual hydraulic system well-known to those skilled in the art that includes a valve 21, a first operating handle 23 for movement by the operator to raise and lower the rearwardly extending draft bars 25, to which the transversely extending tool bar 27 is attached as by clamps 26 or the like. In addition, the hydraulic system of tractor 11 preferably includes the usual quick-way fittings 29, 31 that are disposed on opposite sides of valve 21 and which serve as outlets for the hydraulic fluid when the second operating handle 33 is properly positioned. These quick-way fittings 29, 31 are of the usual type well-known to those skilled in the art, and it will be understood that when handle 33 is in a forward or first position, shown in solid lines in FIG. 5, hydraulic fluid will be supplied under pressure and caused to flow through quick-way fitting 29 only, and when the handle is in the rearward or second position, shown as at "a" in FIG. 5, hydraulic fluid under pressure will be supplied through quick-way fitting 31. Also, it will be understood that when handle 33 is in the center or third position, shown as at "b" in FIG. 5, the hydraulic pressure at fittings 29, 31 will be cut off, and any fluid in the lines will be allowed to drain back into the reservoir, not shown, so that the devices connnected to the quick-way fittings 29, 31 will be free to move, as will be more apparent in the description to follow later in the specification. It is believed that the foregoing description of tractor 11 and its related parts is sufficient since they are well-known to those skilled in the art and form no part of the present invention.

Marker apparatus 13 of the present invention preferably includes a pair of marker mechanisms 35, 37 which are substantially identical except that one is of left-hand construction and the other of right-hand construction, and they are removably mounted adjacent the opposite ends of tool bar 27. Since the mechanisms 35, 37 are substantially identical, the following description of marker mechanism 35 should suffice for both.

Marker mechanism 35 comprises a frame 39 fixedly and removably attached to tool bar 27 adjacent the left end thereof, as by means of clamps 41, 43. Clamp 41 includes an upper clamp half 45 arranged to fit over the tool bar 27 with the upper half of the tool bar engaged in an inverted V-shaped notch 47 in the clamp half 45. Additionally, clamp 41 includes a removable lower clamp half 49 adapted to extend below the tool bar 27 with the lower half of the tool bar extending into a substantially V-shaped notch 51 in the clamp half 49. Clamp halves 45, 49 are held in clamping engagement with tool bar 27 by means of the bolts 53 which extend upwardly through bores in clamp half 49 and threadedly into threaded sockets in clamp half 45. Clamp 43 is constructed similar to clamp 41 and thus includes clamp halves 55, 57 and bolts 58. Clamp 41 is located near the end of the tool bar 27, and clamp 43 is spaced inwardly therefrom. The clamps 41, 43 are arranged in this spaced relationship so that frame 39 can fit over any lever, working bar, shaft or the like which may be in various locations on tool bar 27, depending upon whether the rows are narrow or wide.

Figure 3:
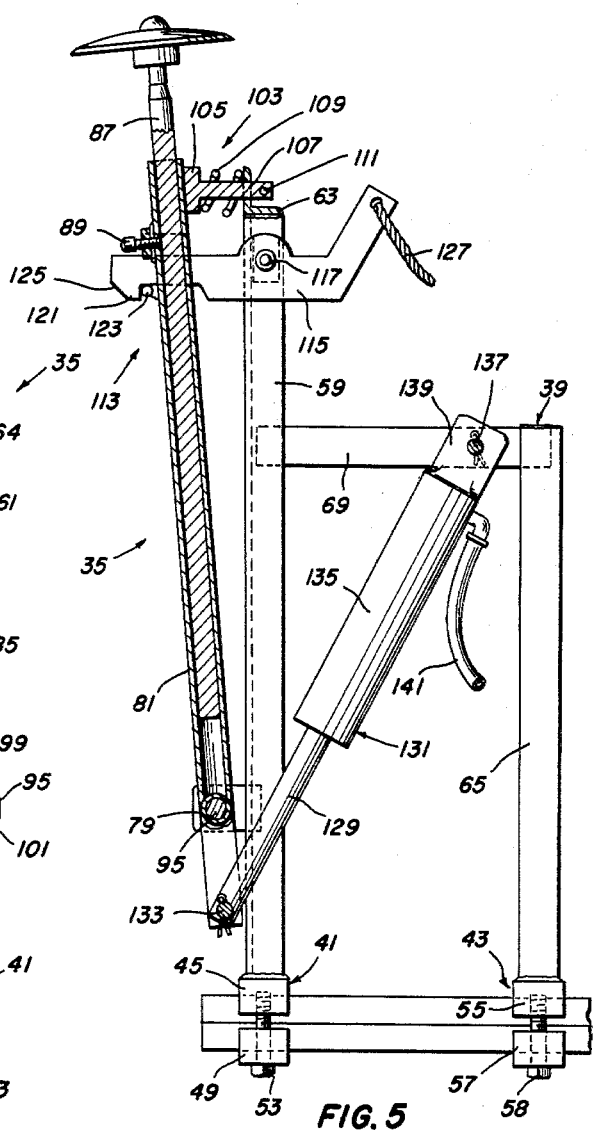
FIG. 3 is a fragmentary sectional view taken as on the line III—III of FIG. 2.
Figure 4:
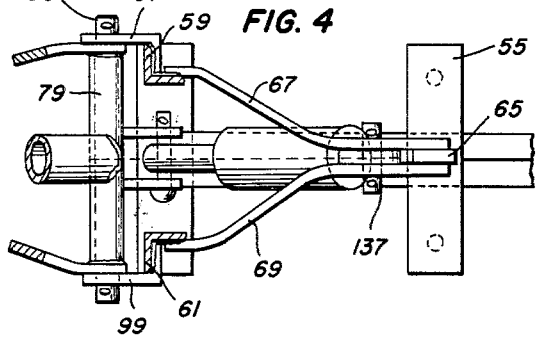
FIG. 4 is a fragmentary sectional view taken as on the line IV—IV of FIG. 1.

Frame 39 includes a pair of horizontally spaced vertical angle members 59, 61 that are fixedly attached to clamp half 45, as by welding or the like, and upstand therefrom. A horizontal angle member 63 rigidly interconnects angle members 59, 61 adjacent the upper ends thereof and is fixedly attached thereto as by welding or the like. Another horizontal angle member 64 rigidly interconnects angle members 59, 61 intermediate the upper and lower ends thereof. In addition, frame 39 includes a vertical bar 65 that is fixedly attached to clamp half 55 adjacent the middle thereof, as by welding or the like, and upstands therefrom. Vertical bar 65 does not extend as high as angle members 59, 61, as best seen in FIG. 3, and is rigidly interconnected to the angle members as by means of the horizontally extending straps 67, 69 that are respectively fixedly attached adjacent one of the ends thereof to vertical bar 65 adjacent the upper end thereof, as by welding or the like. The straps 67, 69 extend outwardly from vertical bar 65 in substantially spaced parallel relationship, as best seen in FIG. 4, for a short distance and then in diverging relationship to their outer ends where they are respectively fixedly attached to angle members 59, 61 intermediate the upper and lower ends of the angle members.

A marker arm 71 having an earth-marking disc 73 mounted on the outer end thereof, and which arm is preferably in the shape of an A-frame, is pivotally mounted from frame 39 for pivot about a horizontal axis extending fore and aft substantially in the direction of travel of the tractor 11 and perpendicular to tool bar 27. Marker arm 71 is pivotable between a lowered working position, shown in broken lines in FIG. 1 as at 75, in which disc 73 is in engagement with the ground G, and raised positions, such as the partially raised position of marker arm 71 shown in solid lines in FIG. 1 and the latched position shown by the marker arm 77 of marker mechanism 37 in FIG. 1. The construction of marker arm 71 is preferably as follows: A horizontally extending tube 79 is fixedly attached at right angles to the lower end of a cylindrical member 81, as by welding or the like, with the cylindrical member 81 extending outwardly from adjacent the middle of tube 79. Also, arm 71 includes a pair of braces 83, 85 which have apertures therethrough adjacent the lower ends thereof and through which the opposite ends of tube 79 respectively extend where the tube and the braces are fixedly joined as by welding or the like. The braces 83, 85 converge inwardly toward one another towards the opposite ends of the braces from tube 79 where they are respectively fixedly attached to cylindrical member 81 adjacent the upper end of the cylindrical member as by welding or the like. The end of cylindrical member 81 opposite from tube 79 is open and telescopically receives therein a rod 87, which is a part of arm 71, so that the overall length of the arm can be adjusted to accommodate for the marking of different widths of rows. A set screw 89 is threadedly engaged in a threaded aperture in cylindrical member 81, with the inner end of the set screw engaging rod 87 to anchor the rod at a selected place to give the desired overall length of arm 71. Additionally, arm 71 includes an extension in the form of a pair of spaced apart members 91, 93 that are fixedly attached to tube 79 and extend therefrom in the opposite direction from the extension of cylindrical member 81 from the tube. Marker arm 71 is pivotally mounted from frame 39 as by means of a pin 95 extending through tube 79 and with the ends of the pin respectively extending through apertures in spaced apart brackets 97, 99 that are respectively fixedly attached to angle members 59, 61 intermediate the upper and lower ends thereof, as by welding or the like, and with the pin being held in place by means of the cotter pins 101.

A bumper 103 is provided on frame 39 for arm 71 to hit against when moving into the latching position. Bumper 103 preferably comprises a head 105 adapted to contact the frame 39 and a guide 107 (see FIG. 3) fixedly attached to the rearward side of head 105 and rearwardly extending therefrom slidably through an aperture provided in horizontal member 63. In addition, bumper 103 includes a spring 109 extending between horizontal member 63 and the rearward side of head 105 to urge the head towards the left, as viewed in FIG. 3. A pin 111 extends through an aperture in the rearward end of guide 107 to limit movement of the guide and head 105 to the left, as viewed in FIG. 3.

A latching device 113 interacts between frame 39 and marker arm 71 to latch the marker arm when the marker arm is in a latching positon. Latching device 113 preferably includes a lever arm 115 pivotally mounted from angle member 59 as by means of the pivot pin 117 extending through aligned apertures in the lever arm, mounting bracket 119, and angle member 59. Lever arm 115 is provided with a hook 121 adjacent the outer end thereof which is adapted to fit over a projection 123 that forms a part of latching device 113 and which is fixedly attached to brace 83. Also, the extremity of lever arm 115 is preferably angled as at 125 so that as the marker arm 71 is moved towards a latching position from lowered positions, engagement of projection 123 with the angle portion 125 will cause the lever arm to pivot clockwise, as viewed in FIG. 3, and allow the hook 121 to engage the projection and latch the marker arm, as best seen in FIG. 3. With the marker arm 71 latched in the position heretofore described, the spring 109 is preferably under compression. The inner end of lever arm 115 is preferably, though not necessarily, turned upwardly, as best seen in FIGS. 1 and 3, and is provided with an aperture through which extends an elongated flexible member 127 that is preferably in the form of a rope and which is attached to the lever arm at the aperture and extends inwardly where it is attached to tractor 11, as in an aperture on the seat 19, as best seen in FIG. 1.

The end of a piston rod 129 of a piston-cylinder assembly 131 is pivotally attached to members 91, 93 as by means of a pivot pin 133 which extends through aligned apertures in the end of piston rod 129 and members 91, 93. The base end of the cylinder 135 of piston-cylinder assembly 131 is pivotally attached to frame 39 by means of a pivot pin 137 extending through aligned apertures in lug 139, which is fixedly attached to the end of the cylinder, and apertures in straps 67, 69.

A conduit 141, which is communicated adjacent one end to the interior of cylinder 135 adjacent the base end therof, extends from the piston-cylinder assembly 131 to a fitting 143 at the opposite end thereof which is of the usual type and is detachably engaged with the quick-way fitting 29 in the usual manner.

It will be understood that suitable implements, such as corn planters 145 which are shown in broken lines in FIG. 1, may be attached to tool bar 27 with the tool bar carrying the planters rearwarly thereof and adapted to lift them in the usual manner when the draft bars 25 are caused to raise by movement of first operating lever 23.

Figure 2:
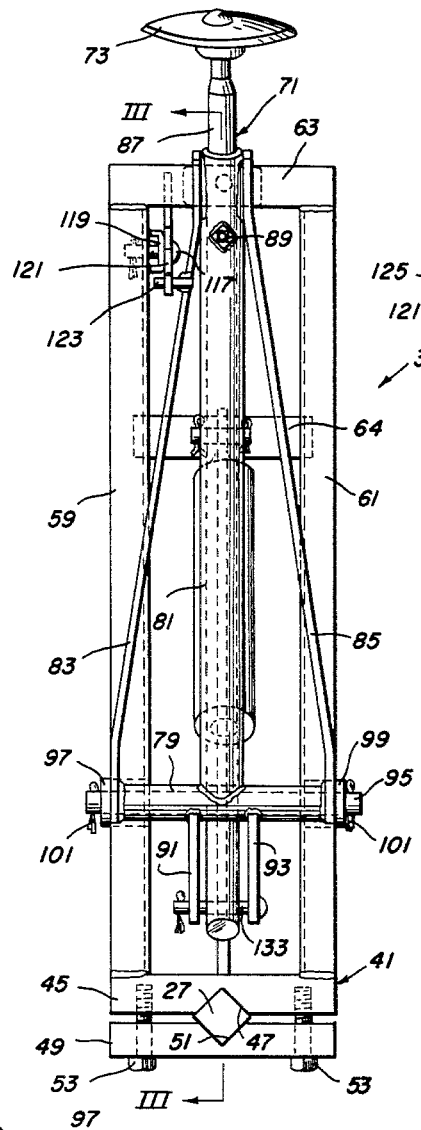
FIG. 2 is an enlarged side elevational view of a row marker of the present invention shown mounted on a tool bar.
Figure 5:
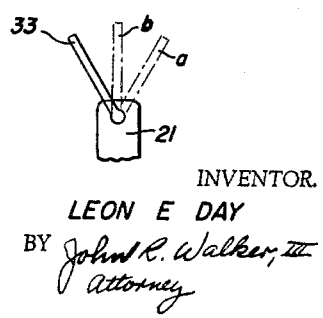
FIG. 5 is a fragmentary side view showing one of the hydraulic actuating levers in various positions.

In describing the operation of marker mechanism 35, it is assumed that the marker mechanism is in the heretofore described working position, shown in broken lines in FIG. 1, and that the second operating handle 33 is in said center position, shown as at "b" in FIG. 5. When in this position, it will be understood that there is no hydraulic pressure in the conduit 141 and that piston rod 129 is not held by the hydraulic fluid but is free to slide so that the marker arm 71 is free to move upwardly and downwardly as high and low spots are encountered. When it is desired to raise marker arm 71, it will be understood that this can be done independently and without any movement of the tool bar 27, by the operator simply moving the handle 33 into the forward position, shown in solid lines in FIG. 5, whereupon the hydraulic fluid will flow under pressure through conduit 141 and cause extension of piston rod 129. This, in turn, pushes downwardly on the members 91, 93 to cause marker arm 71 to pivot clockwise, as viewed in FIG. 1 and towards said latching position. Just before the marker arm 71 reaches the latching position, the marker arm will encounter the bumper 103, and then will move into the latching position, best shown in FIG. 3, whereupon hook 121 will engage over projection 123 in the manner heretofore described. Next, the operator moves the first operating handle 23 into said center position, shown as at "b" in FIG. 5, whereupon all of the hydraulic pressure will be released from the piston-cylinder assembly 131. The marker arm 71 is now ready for release at any time desired. When the operator wants to release the marker arm 71, he merely pulls elongated member 127 to rotate lever arm 115 clockwise, as viewed in FIGS. 1 and 2, and release the marker arm 71. It will be noted that when the marker arm is in said latching position, best seen in FIG. 3, the marker arm is slightly inclined outwardly away from the tractor 11 so that it will rotate counterclockwise, as viewed in FIG. 3, under the influence of gravity and downward until it reaches said working position.

Marker mechanism 37 is operated in a manner substantially identical with the above-described operation of marker mechanism 35 by manipulation of handle 33 into the rearward position, shown as at "a" in FIG. 5, to raise arm 77 and by pull upon elongated member 147 to release arm 77.

From the foregoing description, it will be seen that a very effective and unique marker apparatus 13 is provided in which both of the marker mechanisms 35, 37 are operable independently of each other and of the tool bar 27. Also, it will be understood that the only time the hydraulic system is used in connection with the marker arms 71, 77 is in the raising thereof, and that at other times the marker arms are mechanically and manually actuated so at these latter times the hydraulic system of the tractor will not be influenced in any way by the actuation of the marker arms. In addition, it will be understood that the marker arms are easily and conveniently actuated regardless of the position of the tool bar, that is, whether it is raised or lowered.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A row marker apparatus adapted to be used with a tractor of the type having a hydraulic system and having a movable tool bar carried by the tractor for movement over the ground, said row marker apparatus comprising a pair of frames, a pair of means attached to said pair of frames for respectively mounting said frames on said tool bar in widely spaced relationship at opposite ends of said tool bar, a pair of marking arms, a pair of earth-marking elements respectively mounted on the end of said arms, a pair of means respectively pivotally mounting said arms on said frames for independent pivot of said arms between lowered working positions in which said marking elements are adapted to contact the ground and raised positions, a pair of independent hydraulic means respectively coupled directly to said frames and directly to said arms and adapted to be actuated independently responsive to said hydraulic system to raise respectively said arms into said raised positions independently of movement of said tool bar.

2. A row marker apparatus adapted to be used with a tractor of the type having a hydraulic system and having a tool bar carried by the tractor for movement over the ground, said row marker apparatus comprising a pair of frames, a pair of means attached to said frames for respectively mounting said frames on said tool bar in widely spaced apart relationship adjacent the ends of said tool bar, a pair of marking arms, a pair of earth-marking elements respectively attached to said arms adjacent the outer ends thereof, a pair of means respectively pivotally mounting said arms on said frames, for pivot of said arms between lowered working positions in which said marking elements are adapted to contact the ground and raised positions including latching positions, a pair of latch means respectively cooperating between said frames and said arms for automatically latching said arms in said latching positions when said arms are raised into said latching positions, when released said arms being independently pivotable under the force of gravity of said working positions, a pair of independent hydraulic piston-cylinder assembly means respectively interposed between said frames, and said arms and attached directly thereto, a pair of means respectively attached to said pair of piston-cylinder assembly means for coupling said pair of piston-cylinder assembly means to said hydraulic system of the tractor, and said arms being adapted to move independently from said working positions to said latching positions, and intermediate positions responsive respectively to independent actuation of said pair of piston-cylinder assembly means when hydraulic pressure is respectively applied therein by said hydraulic system.

3. A row marker apparatus adapted to be used with a tractor of the type having a hydraulic system and having a tool bar carried by the tractor for movement over the ground, said row marker apparatus comprising a pair of frames, a pair of means attached to said frames for respectively mounting said frames on said tool bar in widely spaced relationship adjacent the ends of said tool bar, a pair of marking arms, a pair of earth-marking elements respectively attached to said arms adjacent the outer ends thereof, a pair of means respectively pivotally mounting said arms on said frames for pivot of said arms between lowered working positions in which said marking elements are adapted to contact the ground and raised positions including latching positions, a pair of latch means respectively cooperating between said frames and said arms for automatically latching said arms in said latching positions when said arms are raised into said latching positions, a pair of releasing means with each including an elongated member extending from a said latch means and adapted to extend to said tractor for releasing a said arm when a pull is exerted on said elongated member, when released said arms being pivotable under the force of gravity to said working positions, a pair of independent hydraulic piston-cylinder assembly means respectively interposed between said frames and said arms and attached thereto, a pair of means respectively attached to said pair of piston-cylinder assembly means for coupling said pair of piston-cylinder assembly means to said hydraulic system of said tractor, and said arms being adapted to move independently from said working positions to said latching positions and intermediate positions responsive respectively to actuation of said pair of piston-cylinder assembly means when hydraulic pressure is respectively applied therein by said hydraulic system.

4. The row marker apparatus of claim 3 in which each of said a pair of latch means comprises a lever arm pivotally mounted on said frame, said lever arm including a hook adjacent one end thereof, and a projection fixedly mounted on said arm adapted to be engaged with said hook when said arm is in said latching position.

5. The row marker apparatus of claim 3 in which each of said pair of arms includes a cylindrical member, a rod telescopically received in said cylindrical member for varying the length of said arm, and set screw means interacting between said cylindrical member and said rod for releasably holding said arm at a selected length.

6. The row marker apparatus of claim 3 in which is included a pair of bumper means respectively interacting between said arms and said frames when said arms are respectively adjacent said latching positions.

7. The combination with a tractor of the type having power lift apparatus including a generally vertically swingable implement-receivable draft means adjacent the rear of said tractor operated by a first lever means and said tractor having at least one quick-way hydraulic fitting operated by a second lever means for supplying hydraulic fluid under pressure from said fitting and to cut off the flow therethrough and including a tool bar attached to said draft means and extending transversely and rearwardly of said tractor, of a hydraulically actuated row marker mechanism comprising a frame fixedly attached to said tool bar adjacent an end thereof, a marking arm, said arm including a symmetrically arranged A-shaped frame, an earth-marking element attached to said arm adjacent the outer end thereof, means pivotally mounting said arm on said frame intermediate the ends of said arm to provide an extension of said arm downwardly beyond the pivot mounting thereof for pivot of said arm between a lowered working position in which said marking element is in contact with the ground and raised positions including a latching position, latch means cooperating between said frame and said arm for automatically latching said arm in said latching position when said arm is raised into said latching position, releasing means including an elongated member extending from said latch means to said tractor for releasing said arm when a pull is exerted on said elongated member, when released said arm being pivotable under the force of gravity to said working position, hydraulic piston-cylinder assembly means interposed between said frame and said extension of said arm and said piston-cylinder assembly means being movable between retracted and extended positions, means pivotally connecting one end of said piston-cylinder assembly means directly to said frame, additional means pivotally connecting the other end of said piston-cylinder assembly means directly to said extension, said piston-cylinder assembly means including means therein for moving said piston-cylinder assembly means towards said extended position upon hydraulic pressure being applied therein to push against said arm extension, conduit means coupling said piston-cylinder assembly means to said quick-way hydraulic fitting, and said arm being movable from said working position to said latching position by said piston-cylinder assembly means when hydraulic pressure is applied therein upon operation of said second lever means to supply hydraulic pressure whereupon said arm is latched by said latch means so that the hydraulic pressure can be cut off from said piston-cylinder assembly means by said second lever means to place said arm in a ready condition for subsequent releasing by said releasing means.

8. The combination with a tractor of the type having power lift apparatus including a generally vertically swingable implement-receivable draft means adjacent the rear of said tractor operated by a first lever means and said tractor having quick-way hydraulic fittings operated by a second lever means for supplying hydraulic fluid under pressure from said fittings and to cut off the flow therethrough and including a tool bar attached to said draft means and extending transversely and rearwardly of said tractor, of a hydraulically actuated row marker apparatus comprising a pair of widely spaced row marker mechanisms adjacent opposite ends of said tool bar; each of said row marker mechanisms comprising a frame fixedly attached to said tool bar adjacent an end thereof, an extendable marking arm, said arm including a symmetrically arranged A-shaped frame, an earth-marking element attached to said arm adjacent the outer end thereof, means pivotally mounting said arm on said frame intermediate the ends of said arm to provide an extension of said arm downwardly beyond the pivot mounting thereof for pivot of said arm between a lowered working position in which said marking element is in contact with the ground and raised positions including a latching position, latch means cooperating between said frame and said arm for automatically latching said arm in said latching position when said arm is raised into said latching position, releasing means including an elongated member extending from said latch means to said tractor for releasing said arm when a pull is exerted on said elongated member, when released said arm being pivotable under the force of gravity to said working position, hydraulic piston-cylinder assembly means interposed between said frame and said extension of said arm and said piston-cylinder assembly means being movable between retracted and extended positions, means pivotally connecting one end of said piston-cylinder assembly means directly to said frame, additional means pivotally connecting the other end of said piston-cylinder assembly means directly to said extension, said piston-cylinder assembly means including means therein for moving said piston-cylinder assembly means towards said extended position upon hydraulic pressure being applied therein to push against said arm extension, conduit means coupling said piston-cylinder assembly means to one of said quick-way fittings, and said arm being movable from said working position to said latching position by said piston-cylinder assembly means when hydraulic pressure is applied therein upon operation of said second lever means to supply hydraulic pressure whereupon said arm is latched by said latch means so that the hydraulic pressure can be cut off from said piston-cylinder assembly means by said second lever means to place said arm in a ready condition for subsequent releasing by said releasing means, when said arm is in a working position and said hydraulic pressure is cut off said arm being freely pivotable for upward and downward movement to conform to irregularities in the ground.

References Cited by the Examiner
UNITED STATES PATENTS

| | | | |
|---|---|---|---|
| 1,917,733 | 7/1933 | Psikal et al. | 172—126 |
| 2,657,623 | 11/1953 | Allen | 172—128 |
| 2,748,686 | 6/1956 | Nelson et al. | 172—128 |
| 2,800,847 | 7/1957 | Bennett | 172—491 X |
| 2,828,679 | 4/1958 | Hansen | 172—126 |
| 2,962,103 | 11/1960 | Hansen | 172—126 |
| 2,973,043 | 2/1961 | Elfes | 172—9 |
| 3,139,941 | 7/1964 | Graham et al. | 172—130 |
| 3,146,833 | 9/1964 | Friemel et al. | 172—126 |

FOREIGN PATENTS

| | | |
|---|---|---|
| 769,911 | 3/1957 | Great Britain. |

ABRAHAM G. STONE, *Primary Examiner.*

F. B. HENRY, *Assistant Examiner.*